United States Patent [19]
Namngani

[11] Patent Number: 5,730,256
[45] Date of Patent: Mar. 24, 1998

[54] MECHANICAL ANTI-LOCK BRAKING SYSTEM

[76] Inventor: Abdulatif Namngani, P.O. Box 13925, Jeddah 21414, Saudi Arabia

[21] Appl. No.: 407,079

[22] Filed: Mar. 20, 1995

[51] Int. Cl.⁶ .................................................. B60T 1/00
[52] U.S. Cl. .................. 188/2 A; 188/24.22; 188/24.11; 303/137
[58] Field of Search ................. 188/2 A, 24.11, 188/24.12, 24.22; 303/137, 113.1, 116.3

[56] References Cited

U.S. PATENT DOCUMENTS

| | | |
|---|---|---|
| 1,842,259 | 1/1932 | Frankland . |
| 3,655,016 | 4/1972 | Watanabe ................ 188/2 A X |
| 4,351,418 | 9/1982 | Woodring ................ 188/24.22 |
| 5,344,220 | 9/1994 | Roll et al. ................ 303/9.64 |
| 5,344,222 | 9/1994 | Helldorfer et al. ................ 303/100 |
| 5,346,293 | 9/1994 | Higashi ................ 303/92 |

*Primary Examiner*—Robert J. Oberleitner
*Assistant Examiner*—Peter M. Poon
*Attorney, Agent, or Firm*—Bacon & Thomas

[57] ABSTRACT

A mechanical anti-lock braking apparatus for intermittently releasing pressure applied by a brake shoe to a wheel being braked includes a control member, a power input for causing the control member to rotate with the wheel around a rotational axis, and a control input for changing the position of the control member relative to a follower connected to the calipers or brackets to which the brake shoe is mounted. The control member and/or the follower has a shape which causes the follower to oscillate as the control member rotates, with the relative position of the control member and follower determining the magnitude of the oscillations.

26 Claims, 6 Drawing Sheets

MECHANICAL ANTI-LOCK BRAKING SYSTEM

BACKGROUND OF THE INVENTION

1. Field of the Invention

This invention relates to an anti-lock braking system (ABS), and in particular to a mechanical anti-lock braking system which is responsive to both the speed of the wheel being braked and to the braking pressure applied by the operator of the vehicle.

2. Description of Related Art

In most wheeled vehicles, braking is carried out by using the dynamic friction between a brake pad or shoe and the wheel being braked to convert the energy of motion of the vehicle into heat energy. Braking is at its most efficient when all of the energy of the vehicle represented by the vehicle's forward momentum is converted into heat by the friction between the brake shoe and the wheel. Maximum energy conversion will occur so long as a point on the surface of the wheel or tire which contacts the roadway is stationary relative to the roadway, i.e., so long as the wheel is rotating and not sliding relative to the roadway. When the point of contact between the wheel and the roadway is not stationary, then some of the energy represented by the vehicle's forward momentum is converted to friction at the wheel/roadway interface. Brake locking occurs when the pressure applied by the brake shoe against the wheel causes the energy of deceleration of the vehicle to momentarily exceed that which can be converted to heat at the brake shoe/wheel interface, the excess energy overcoming the static friction between the wheel and the roadway, causing the wheel to slide relative to the roadway and resulting in a situation where the vehicle's momentum is no longer transferred to the brake shoe/wheel interface, but rather is partially transferred to the interface between the wheel or tire and the roadway. Because the coefficient of dynamic friction at the wheel/roadway interface is significantly lower than that of the brake shoe/wheel interface, the amount of momentum converted to heat during the braking process greatly decreases, and as a result the time necessary to stop the vehicle is increased.

If the static friction coefficient of the roadway could be determined with accuracy, the exact amount of braking pressure required to stop the vehicle in the shortest amount of time without overcoming that friction could also be determined. However, since there is no direct way to accurately measure the conditions of a roadway from a moving vehicle, except by detecting a drop in the speed of the wheel relative to what is expected based on the vehicle deceleration and previous speed or braking pressure, a process which requires numerous calculations to be performed in real time, current anti-lock braking systems require relatively sophisticated and expensive computing systems. Most are designed for motor vehicles having hydraulically-activated brake mechanisms, and operate by relieving the pressure of the hydraulic fluid which activates the brake using an electro-mechanical valve controlled by a computer, the computer in turn electronically monitors the speed or deceleration of the vehicle, the turning of the wheels, and/or the applied braking pressure to determine when a locking condition has occurred. Examples of current electronically controlled anti-lock braking systems are found in U.S. Pat. Nos. 5,344,220, 5,344,222, and 5,346,293.

The increasing utilization of anti-lock braking in automobiles, made possible by advances in computer technology, is believed to have resulted in significant increases in safety, since automobiles are the greatest single source of accidental injuries and deaths. Often ignored, however, is the incidence of injuries resulting from accidents involving personal land vehicles other than automobiles, and in particular pedal powered vehicles such as bicycles and "dicycles." An accident resulting from the loss of control of a pedal powered vehicle during braking as a result of wheel locking can be just as devastating as an automobile accident. Even though the speeds attained by pedal-powered vehicles (and other small vehicles such as "all terrain vehicles" and "go-karts") are lower than those of automobiles, the operator is usually less well protected and much more likely to be thrown from the vehicle. In addition, pedal powered vehicles are often operated by children, who lack the experience to operate a braking system in an optimal manner. Possibly because of the high cost of conventional anti-lock braking systems relative to the cost of such vehicles, manufacturers and designers of pedal powered and other small land vehicles do not appear to have even considered, at least publicly, the possibility of including anti-lock braking systems in their vehicles, despite the clear safety advantages which would be obtained.

Aside from the fact that the possibility of including anti-lock braking systems in pedal powered and other small vehicles has not heretofore even been considered, and the problem of cost, there are a number of practical difficulties which make the adaptation of conventional anti-lock braking systems for such vehicles virtually impossible. In general, for example, the brakes on a pedal powered vehicle are cable rather than hydraulically operated, and thus the usual method of relieving brake pressure, involving solenoid valves in the hydraulic lines, cannot be used. In addition, most pedal powered vehicles, and some simple motor vehicles, lack the ability to support the complex electrical components required in conventional anti-lock control systems. While conventional anti-lock braking systems appear to be highly effective, and are currently widely used on automobiles, trucks, and aircraft, no known anti-lock braking system is suitable for simpler vehicles such as bicycles.

This is not to say that mechanical anti-lock braking systems are completely unknown. While current state-of-the-art anti-lock braking systems are heavily dependent on complex electrical circuitry, the principles underlying anti-lock braking have been known almost since the invention of the automobile, before the advent of computers, and thus purely mechanical anti-lock braking systems have in fact previously been proposed, at least for use in automobiles. One such purely mechanical system is described in U.S. Pat. No. 1,842,259, which issued in 1932. This patent discloses a mechanical anti-lock braking system designed for use with the drum brake of an automobile, the anti-lock braking effect being obtained by a cam in the form of a projection on the brake drum which rotates with the wheel of the vehicle and periodically cams the brake shoes away from the wheel during braking to cause the braking pressure to be released at a frequency which depends on rotation of the wheel. However, unlike the present invention, the system described in U.S. Pat. No. 1,842,259 lacks any responsiveness to the magnitude of the applied braking pressure, the amplitude of the oscillations imparted to the brake shoes depending solely on the invariable size of the projections which cause the oscillations as the brake drum rotates. Without such a second input, the intermittent pressure release provided by the camming action of the projections on the brake drum will occur even when it is not needed, i.e., when the applied pressure is too light to lock the wheels, and may provide an insufficient release duration when the applied braking pressure is high, with both conditions having an adverse effect on braking efficiency. In addition, while the camming principle disclosed in this patent is similar to that which underlies the present invention, the design would clearly require substantial modification in order to be used with a simple caliper-type brake of the type commonly included on pedal-powered vehicles, as opposed to an automobile brake drum, and there is absolutely no suggestion in the patent that would have led one of ordinary skill in the art to make such a modification.

To the contrary, during the more than sixty years since U.S. Pat. No. 1,842,259 was issued, no attempt has been made to adapt the purely mechanical system disclosed therein for use in vehicles other than automobiles, or to modify the system to include a second mechanical input representative of the braking pressure applied by the operator of the vehicle. Instead, the trend has inexorably been toward more complex electrical ABS control systems, made possible by the advent of microprocessors and useable only in automobiles and more complex wheeled vehicles. No consideration has, to date, been given the need to reduce the possibility of brake locking in simpler vehicles.

The present invention, on the other hand, is especially suitable for use in pedal powered vehicles and the like, although it could also be used in motor vehicles, and represents a return to the simpler types of design represented by the mechanical anti-lock system disclosed in U.S. Pat. No. 1,842,259, but with a feature found only in sophisticated electronic systems, i.e., responsiveness to applied braking pressure in addition to wheel speed. The resulting non-linear relationship between the frequency at which the braking pressure is released, and also the ability to be used with either cable-operated or hydraulically activated automotive brakes, enables sophisticated control of the mechanical anti-lock braking system while retaining its advantages of simplicity and cost. The present invention, as will be explained in more detail below, thus achieves the ability to respond to both wheel speed and applied braking pressure through the use of a control member which is separate from the wheel or brake drum, unlike the mechanical braking system described in the above-mentioned U.S. Pat. No. 1,842,259, and as a result permits the brake release magnitude and duration to be freely varied.

SUMMARY OF THE INVENTION

It is accordingly an objective of the invention to provide an anti-lock braking system which is simple and inexpensive, and does not require complex electronics to operate.

It is a further objective of the invention to provide an anti-lock braking system for a vehicle which is suitable for use with either cable or hydraulically operated brakes of the type found on simple mechanically operated vehicles, including pedal-powered vehicles such as bicycles.

It is a still further objective of the invention to provide an anti-lock braking system for a vehicle in which the relationship between the wheel speed and the magnitude and duration of the release may be freely chosen, the actual braking pressure/release pattern being a function not only of the wheel speed but also of the applied braking pressure, and yet in which each of the inputs to the braking system, as well as the output and the control logic elements, are all purely mechanical so that the system can be used on vehicles which do not possess an electrical system capable of supporting a computer or microprocessor based ABS control circuit.

These objectives are achieved, according to a preferred embodiment of the invention, by providing a mechanical anti-lock braking apparatus for intermittently releasing pressure applied by a brake shoe to a wheel being braked and which includes a control member, a mechanical power input for causing the control member to rotate with the wheel around a rotational axis, a mechanical control input for moving the control member axially along the rotational axis, and a cam follower having one end connected to the brake pad and one end which engages and follows a camming surface of the control member, the control member having a shape which causes the cam follower to oscillate as the control member rotates, the amplitude of the oscillations varying as the control member is axially moved along the rotational axis. The control member may, for example, be frustoconical in shape, with one end having a generally circular cross-section in a direction perpendicular to the axis of rotation and the other end having a generally elliptical cross-section in the direction perpendicular to the axis of rotation, thereby providing significantly increased controllability relative to linear mechanical anti-lock braking systems of the type disclosed in U.S. Pat. No. 1,842,259 (in which the pressure release duration is a linear function of the wheel speed and not a function of the braking pressure).

In an especially preferred embodiment of the invention, the control member is in the form of an elongated rotatable control member having cross-sections through the member's axis of rotation which vary from circular at one end to highly elliptical at the other end, the rotational input to the control member being through a speedometer type cable which rotates in response to rotation of the wheel being braked, the control input being in the form of cables actuated by the conventional brake actuator for moving the control member axially, and the output being in the form of cam followers which follow the surface of the control member, the control member being axially movable relative to the cam followers to present a range of different cross-sections to the cam followers at a given rotational frequency. The anti-lock braking system of the preferred embodiment of the invention thus provides a simple control which can be operated in a manner identical to the manner in which conventional brakes on this type of vehicle are operated.

In a variation of the above-described preferred embodiment of the invention, movement of the control member is in response to hydraulic pressure supplied by a pump actuated by movement of the brake pads in response to the application of braking pressure rather than by the movement of cables in response to the application of braking pressure.

In a further variation of the above-described preferred embodiment of the invention, the control member takes the form of a profiled surface adjacent a brake disk, the surface engaging pivotal brackets or calipers to which the brake pads are mounted and which are linearly movable in response to the application of braking pressure in a direction parallel to the plane of the brake disk. This embodiment is similar in some respects to the arrangement disclosed in the above discussed U.S. Pat. No. 1,842,259, but offers the advantage of allowing the magnitude of the brake shoe oscillations to be varied with the applied braking pressure.

In a still further variation of the above-described preferred embodiment of the invention, the purely mechanical oscillation of the brake pads is achieved by engagement of a rotating T-shaped member and prism-shaped surfaces on the brake pad calipers or brackets.

DETAILED DESCRIPTION OF THE PREFERRED EMBODIMENTS

Figure 1:
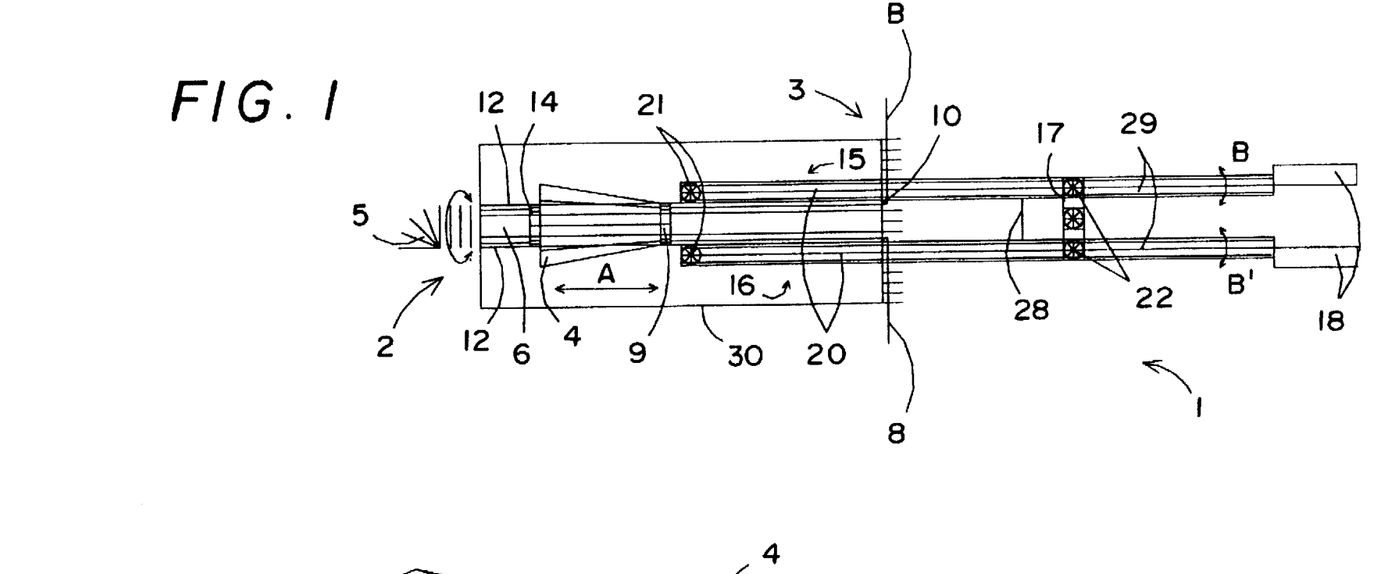
FIG. 1 is a plan view showing the principal components of a mechanical anti-lock braking system constructed in accordance with the principles of a preferred embodiment of the invention.

As shown in FIG. 1, the preferred mechanical anti-lock braking system 1 includes two main inputs 2 and 3, respectively in the form of 1.) a cable arranged to rotate in response to rotation of the wheel being braked and 2.) a cable or hydraulic actuator which is connected to the braking actuator, for example a lever on the handlebar of a pedal operated vehicle. Both inputs 2 and 3 are connected to a control member 4, input 2 being the power input serves as a means for transmitting the rotational motion of the wheel to the control member 4, and input 3 providing a control input which serves as a means for transmitting the braking pressure applied to the actuator (not shown) to control member 4.

Power input 2, which causes the control member 4 to rotate in response to rotation of the wheel being braked, is illustrated as including two parts. The first is a cable 5 connected by means not shown to the wheel of the vehicle to thereby rotate with the wheel and the second in the form of a bar 6 which rotates with the cable and which is fitted through opening 7 in the control member (see FIG. 2) to cause the control member to rotate whenever the wheel rotates. Cable 5 may be in the form of an ordinary speedometer cable, or may be connected to the wheel through a more complex arrangement such as a clutch for disengaging the anti-lock mechanism if desired.

Simple speedometer cable arrangements for pedal-powered vehicles are commercially available and are suitable for use, with the speedometer removed, in the present invention, although those skilled in the art could also design their own custom rotating cable inputs. Similarly, while the illustrated bar and opening arrangement by which the rotation of the cable 5 is transmitted to the control member 4 is especially simple, numerous other arrangements could be devised by those skilled in the art.

Control input 3, which causes the control member 4 to move axially along its axis of rotation, as indicated by arrow A, is also in the form of at least one cable 8, but is attached in the illustrated embodiment by an attachment fixture 9 which is axial movable but which does not rotate to avoid twisting of the cable or cables as the control member rotates. Numerous sliding or roller bearing arrangements are known which may be used to allow the control member to rotate without causing twisting of the input cables. A pulley 10 permits the direction of braking force to be converted to the axial direction of the control member.

As illustrated in FIG. 1, two control input cables are provided in the preferred embodiment to allow input of the applied braking pressure, although only a single cable is actually necessary for purposes of the invention. The inclusion of two cables 8 and pulleys 10, allows input from both the right and left actuator levers found on most pedal powered vehicles.

In order for the mechanical anti-lock braking mechanism of the preferred embodiment to operate properly, it is necessary that the pulling force provided by cable 8 be opposed by a return which biases or causes the control member to move in the opposite direction from the direction in which the control member is moved by cables 8. This return force may be provided by springs or cables 12, as illustrated, which may be in the form of coil springs or of cables extending from the control member on the same side as the first cable input and connected to the above-mentioned braking actuator lever (not shown) to return the control member to a non-braking position whenever the braking lever is released. Springs or cables 12 are preferably connected to the control member via a transmission fixture 14 similar to fixture 9 which is axially movable but does not rotate so as to avoid tangling of the springs or cables.

Figure 4:
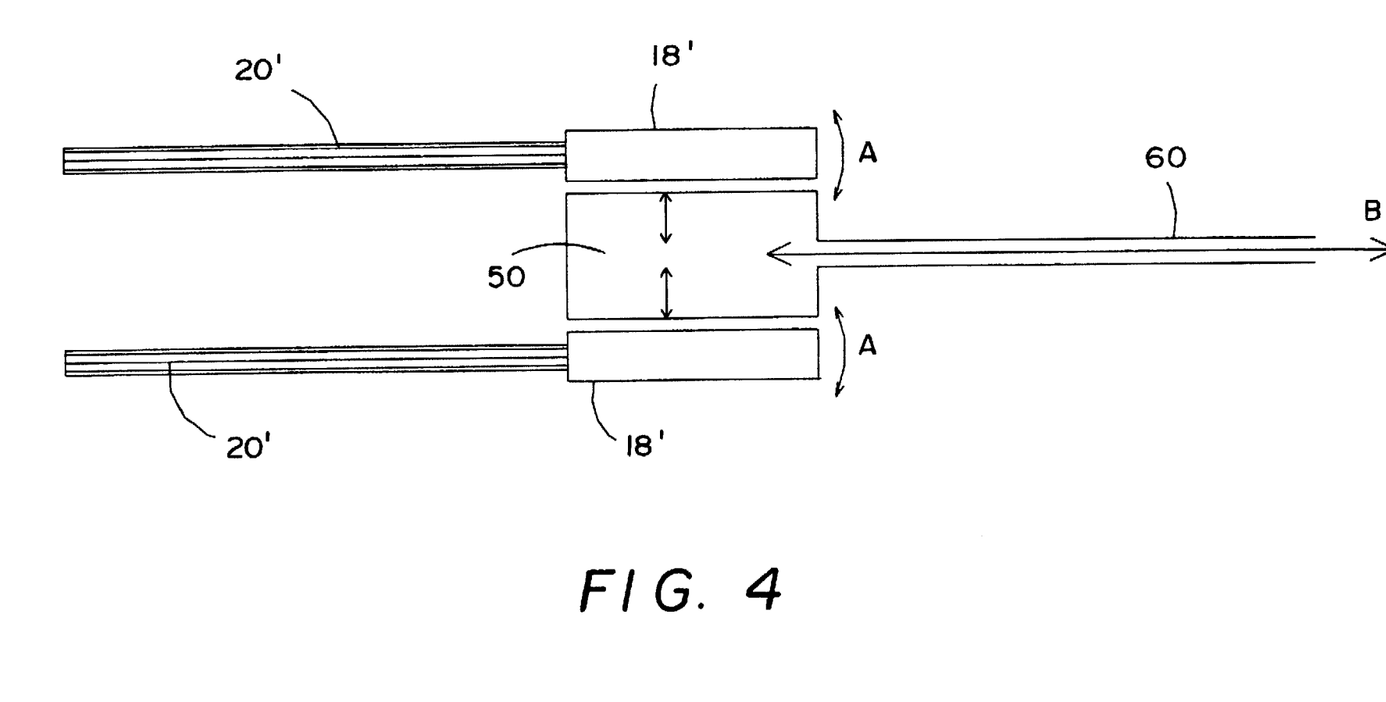
FIG. 4 is a plan view similar to that of FIG. 1 showing a variation of the preferred embodiment of the invention in which the control member is moved indirectly by a pump rather than directly by cables.

Alternatively, as shown in FIG. 4, springs or cables 12 may be replaced by a hydraulic actuator responsive to brake pressure as follows: Whenever pads 18' are moved in the direction of arrows A towards or away from each other each other by the regular hydraulic system in a vehicle with hydraulically actuated brakes, a pump 50 is caused to compress or expand. Pump 50 is hydraulically connected by a line 60 to an actuator (not shown) which in turn is connected to the control member such that the actuator moves the control member in response to fluid flow caused by the action of pump 50 in the direction of arrow B.

Returning to FIG. 1, the output of the preferred anti-lock braking mechanism is in the form of a cam follower assembly made up of two cam follower assemblies 15 and 16 connected together by a member 17 which may be either movable or fixed and which provides pivot point about which the cam followers oscillate, as indicated by arrow B. Movement of the cam followers is transmitted to the brake shoes 18 by additional members 29 which may be discrete from cam followers 15 and 16 or discrete therefrom. The cam followers themselves may, for example, each be formed by two horizontal members 20, only one of which shown for each follower, connected by a cylindrical member 21 which engages the control member 4, and by a second cross member 22 to which the brake shoe support member 29 is connected. Cylindrical members 21 slidingly engage the surface of the cam in response to a biasing force provided by spring 28.

Figure 2:
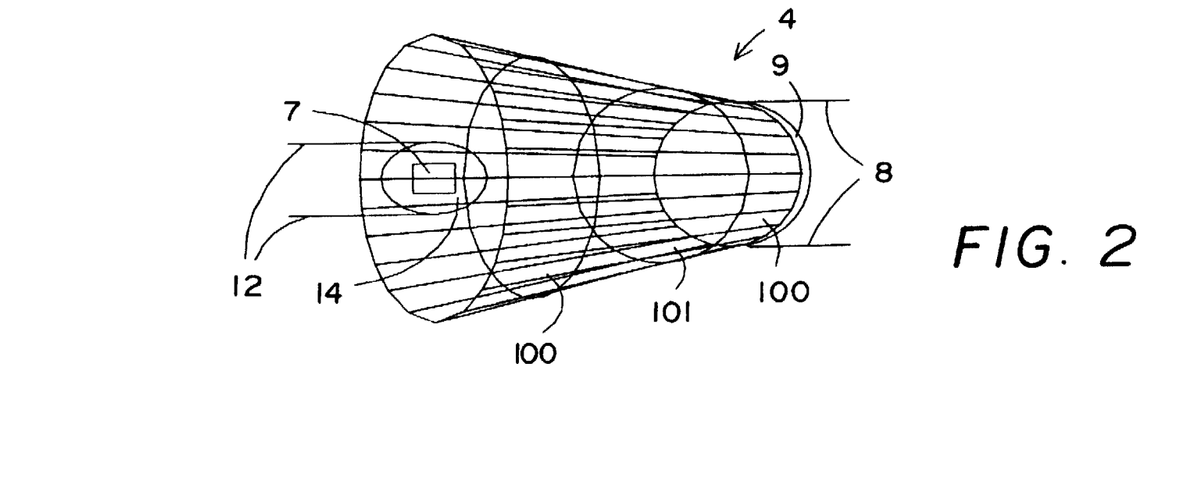
FIG. 2 is a perspective view showing a control member for converting the two inputs to the system of FIG. 1.
Figure 3:
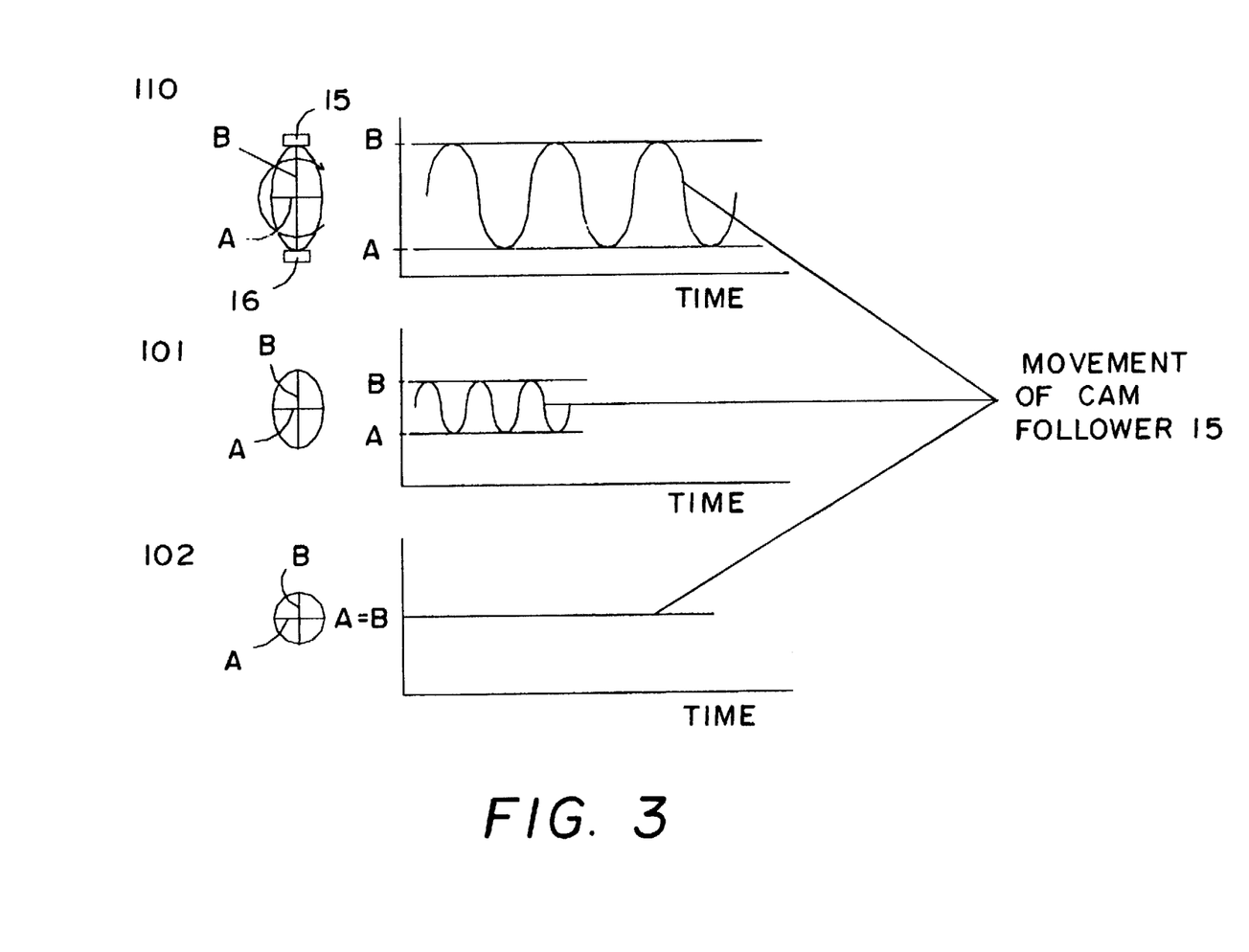
FIG. 3 is a schematic diagram which illustrates the operation of the control member shown in FIG. 2.

Control member 4 is best understood with reference to FIGS. 2 and 3 and includes, in addition to the above-mentioned central opening 7 for transmitting the rotation of bar 6 to cause axial rotation of the control member, a cam surface whose cross-sectional shape perpendicular to its principal axis ranges from circular at one end 101 to moderately elliptical at a central location 102 to highly elliptical at the other end 103. As is apparent from FIG. 3, the eccentricity or ratio of the respective major and minor axes a and b of the ellipses which define the shape of the camming surface of the control member determines the amplitude of the pulsations which occur as the cam followers 15 and 16 follow the surface of the cam. At the circular end 102, the cam follower is stationary and no braking pressure is applied. As the control member is axially moved in response to pulling of cables 8 to present a more elliptical surface 101 to the cam follower 15, the cam follower begins to oscillate between a point defined by the minor axis and a point defined by the major axis of the ellipse. The greater the difference between the minor and major axes of the ellipse, the greater the amplitude of the resulting cam follower, and consequently of the brake shoe, oscillations.

In the embodiment of the invention illustrated in FIGS. 1–3, the control member is thus generally frustoconical in shape, with one end having a generally circular cross-section in a direction perpendicular to the axis of rotation and the other end having a generally elliptical cross-section in the direction perpendicular to the axis of rotation, the eccentricity of the cross-sections varying smoothly and continuously from an eccentricity of one at the generally circular end to a maximum eccentricity at the second end, although those skilled in the art will appreciate that the cross-sections do not necessarily need to be elliptical in shape, nor do they need to vary smoothly and continuously from one end to the other. For example, the perimeter of the control member could form multiple lobes in order to cause the cam followers, and consequently the brake shoes or pads, to oscillate more than two times for each rotation. Moreover, those skilled in the art will appreciate that the manner in which the cam is moved axially to present different cross-sections to the follower may be varied by those skilled in the art, as may the manner in which the oscillations are transmitted to the brake shoes or pads.

In addition, those skilled in the art will appreciate that a housing, schematically represented in FIG. 1 by item 30, may be provided to enclose at least the control member 4, with suitable openings being provided for the various cables 5 and 8, and supports (not shown) for permitting rotation of bar 6. Cables 5 and 8 may further be enclosed and surrounded by hoses (not shown) which allow movement of the cable relative thereto.

Figure 5:
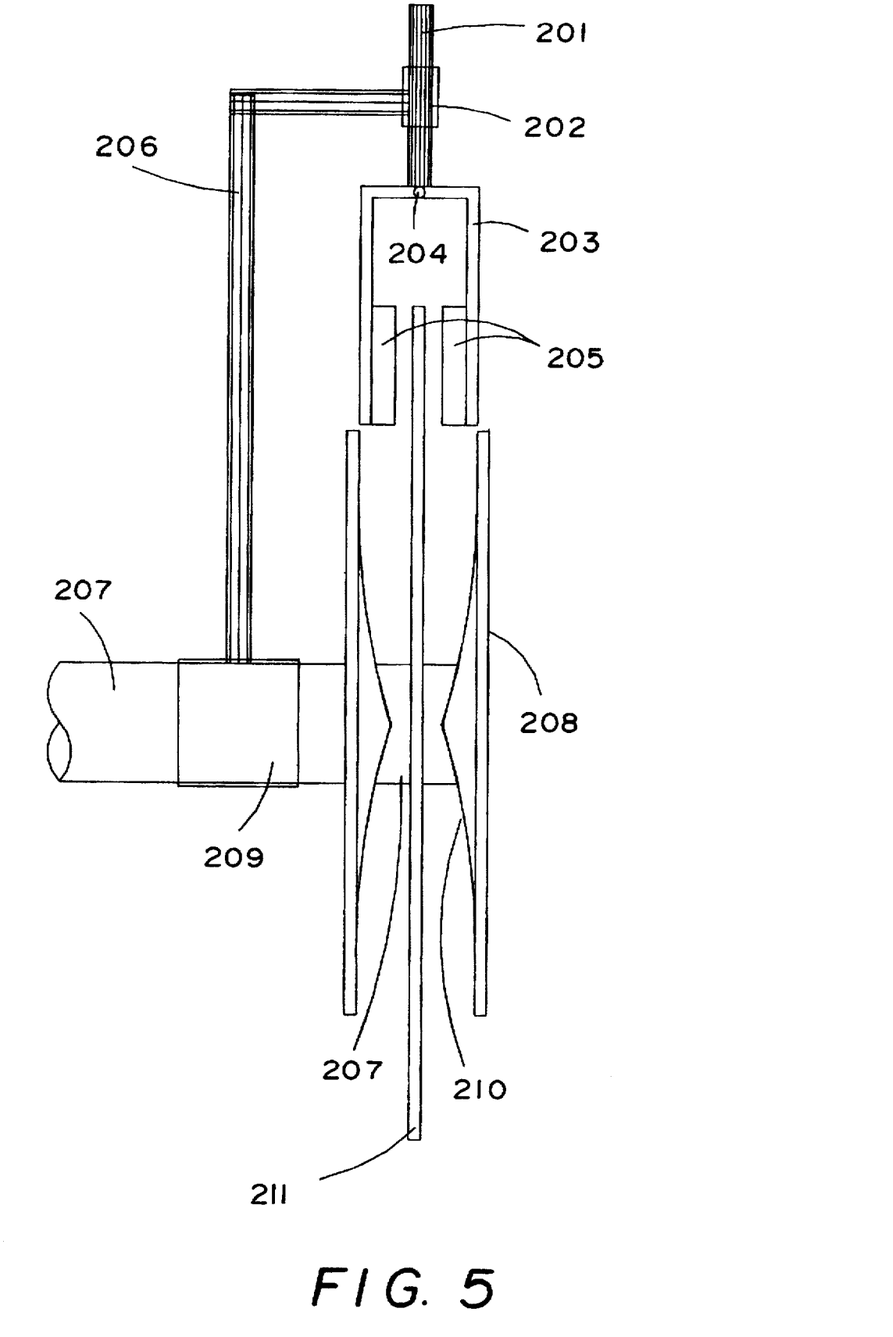
FIG. 5 is a plan view similar to that of FIG. 1 showing a variation of the preferred embodiment of the invention in which the control member is in the form of a contoured surface on a control disk located adjacent a brake disk.
Figure 6:
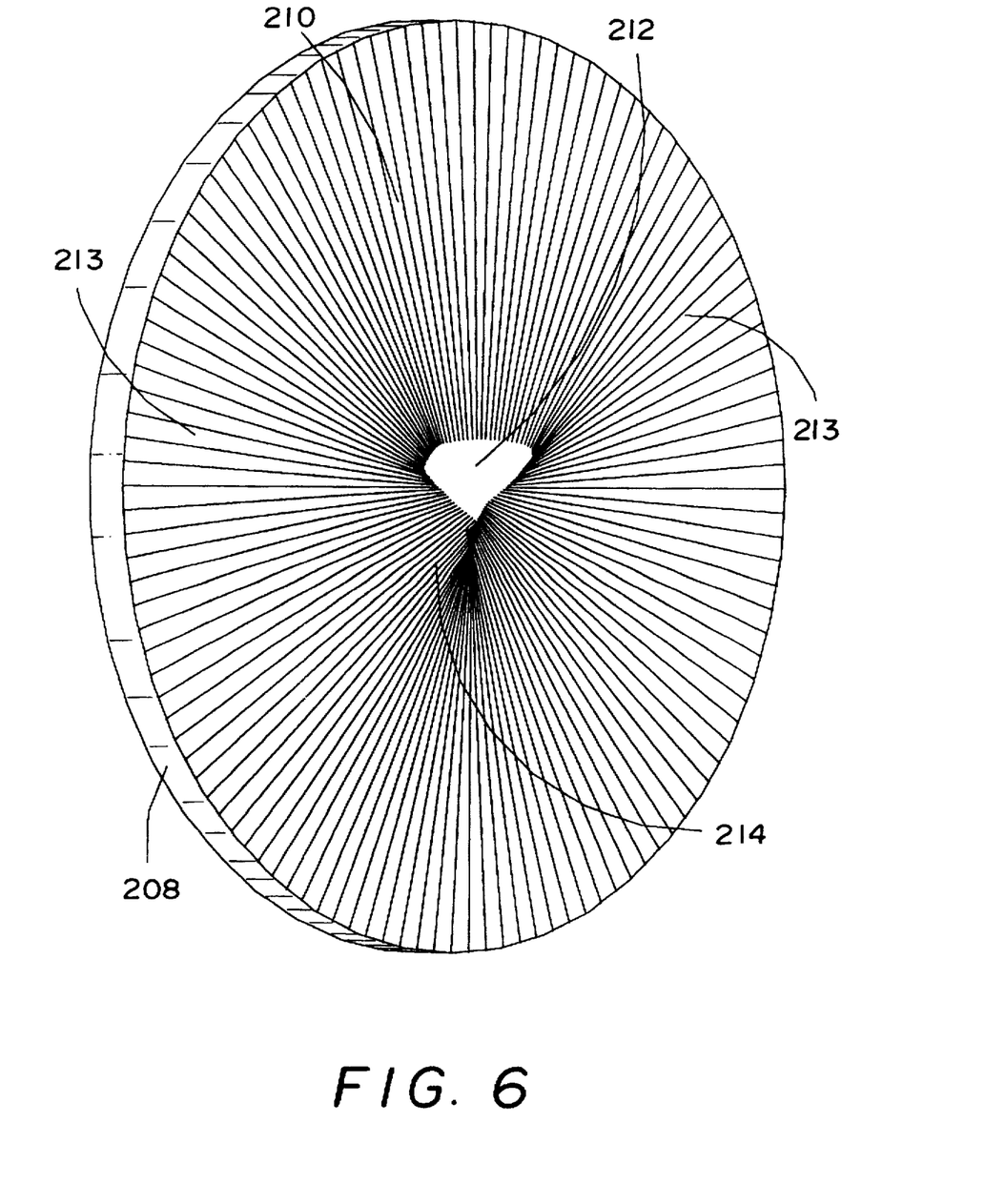
FIG. 6 is a plan view of the contoured surface and control disk taken from a direction transverse to that of FIG. 5.

The principle of controlling an anti-lock braking system in purely mechanical fashion based on the braking pressure and wheel speed, using an axially movable control member having an axially varying profile, can also be applied to systems having alternative pad and disk configurations. For example, according to the embodiment of the invention illustrated in FIGS. 5 and 6, which resembles the arrangement disclosed in the above-mentioned U.S. Pat. No. 1,842,259 but adds the ability to control the magnitude of oscillations, the brake pads 205 are attached to a U-shaped bracket or caliper 203, the two arms of which are connected via a pivot 204 and movable relative to each other to allow the pads to engage brake disk 211. In this embodiment, the control member 208 is provided directly on axle 207 and is in the form of an annular control disk having an inner circumference 212, an outer circumference 213, and a continuously contoured surface 210 which engages bracket 203 to cause pads 205 to oscillate relative to each other and periodically engage the brake disk 211. Control of the magnitude of oscillations is achieved because the caliper is itself linearly movable parallel to the plane of the brake disk in response to linear movement of control member 201 within sleeve 202, sleeve 202 in turn being fixed to bracket 206 and bearing sleeve 209 of axle 207. Contoured surface 210, as shown in FIG. 6, is flat near the outer circumference 213 and continuously contoured outwardly from the plane of the control disk 208 towards the disk's inner circumference 212 so as to form two discrete peaks 214 which cause maximum oscillation of the brake pads 205 at the maximum downward position of member 201.

Figure 7:
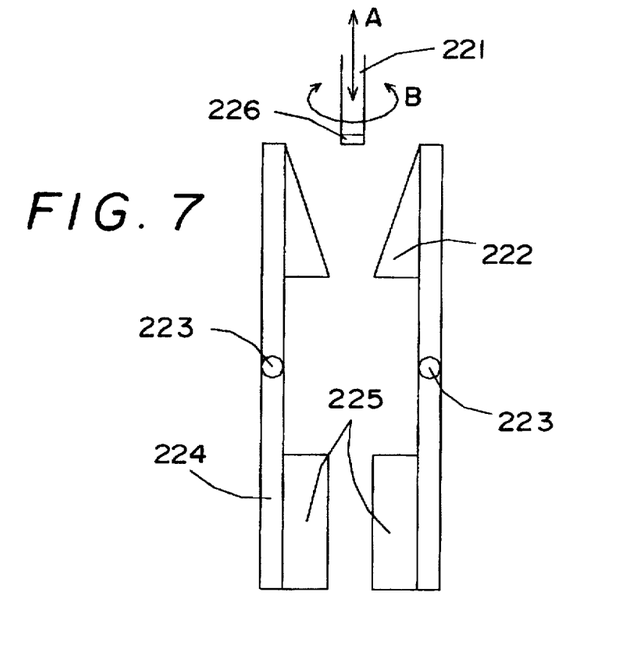
FIGS. 7 and 8 are plan views similar to those of FIGS. 1, 4, and 5 showing a further variation of the preferred embodiment of the invention in which the oscillations of the brake pads are provided by engagement between a rotating T-shaped member and prism shaped members on the brake pad calipers.
Figure 8:
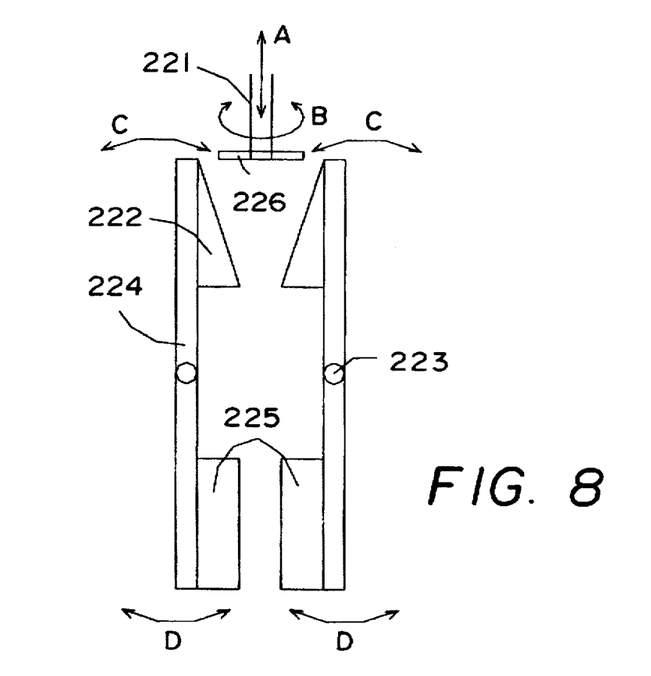

According to yet another variation of the preferred embodiment of the invention, illustrated in FIGS. 7 and 8, oscillations are obtained by means of a rotating member 221 have a cross-bar 226 arranged to engage prism shaped members 222 on brake pad brackets 224 which pivot about points 223. Movement of member 221 in the direction of arrow A causes the rotating cross-bar to engage members 222 and change the amplitude of oscillations in the direction of arrow C, thereby changing the amplitude of oscillations in direction D.

In view of the numerous possible variations and modifications of the invention, only a few of which are described above, those skilled in the art will appreciate that the invention should not be limited by the illustrated embodiment, but rather should be defined solely by the appended claims in accordance with the applicable rules of claim interpretation.

I claim:

1. A mechanical anti-lock braking apparatus for intermittently releasing pressure applied by a brake shoe to a wheel being braked, including:

a control member;

a power input for causing the control member to rotate with the wheel around a rotational axis; and a control input for changing a position of the control member relative to a follower connected to brake shoe mounting members, wherein the control member and follower have shapes which cause the follower to oscillate as the control member rotates, with the relative position of the control member and follower determining the magnitude of the oscillations.

2. Mechanical anti-lock braking apparatus for intermittently releasing pressure applied by a brake shoe to a wheel being braked, comprising:

a control member;

a mechanical power input for causing the control member to rotate with the wheel around a rotational axis;

a control input for moving the control member axially along the rotational axis; and a cam follower having one end connected to the brake shoe and another end which engages and follows a camming surface of the control member, wherein the control member has a shape which causes the cam follower to oscillate as the control member rotates, the amplitude of the oscillations varying as the control member is axially moved along the rotational axis.

3. Apparatus as claimed in claim 2, wherein the mechanical power input comprises a rotatable cable arranged to rotate with the wheel and connected to the control member.

4. Apparatus as claimed in claim 2, wherein the control input comprises at least one cable attached to an end of the control member and arranged to pull the control member along the axis of rotation in response to activation of a manually-operated brake lever.

5. Apparatus as claimed in claim 4, wherein the at least one cable of the control input is attached to the control member by means of an attachment fixture which is axially movable but which does not rotate, and to which the control member is rotatably connected.

6. Apparatus as claimed in claim 4, wherein the mechanical power input comprises a rotatable cable arranged to rotate with the wheel and connected to the control member.

9

7. Apparatus as claimed in claim 2, wherein the control input comprises a pump activated by movement of the brake shoe and hydraulically connected to the control member to thereby move the control member in response to application of braking pressure to the brake shoe.

8. Apparatus as claimed in claim 2, wherein the control member is generally frustoconical in shape, with one end having a generally circular cross-section in a direction perpendicular to the axis of rotation and the other end having a generally elliptical cross-section in the direction perpendicular to the axis of rotation.

9. Apparatus as claimed in claim 8, wherein the eccentricity of the cross-sections varies smoothly from an eccentricity of one at the generally circular end to a maximum eccentricity at the other end.

10. Apparatus as claimed in claim 2, further comprising a second cam follower, the first and second cam followers engaging opposite sides of the control member and being biased against the control member by a spring to separately actuate respective brake shoes which form a caliper braking mechanism that oscillates synchronously, the amplitude of the oscillations changing as different cross-sections of the control member are presented to the cam followers in response to axial movement of the control member.

11. Apparatus as claimed in claim 2, wherein the control member is a T-shaped member and the cam follower is a prism shaped member positioned on a pivotal brake shoe mounting bracket.

12. Mechanical anti-lock braking apparatus for intermittently releasing pressure applied by a brake shoe to a wheel being braked, comprising:

means for inputting a wheel speed;

means for inputting a magnitude of braking pressure applied by an operator of the vehicle;

means for causing the brake shoe to oscillate in response to said wheel speed inputting means and said magnitude inputting means at a frequency which is dependent on the rotation of the wheel and at an amplitude which is dependent on the applied braking pressure, wherein the respective inputting means and the oscillation causing means include no electrical components.

13. Apparatus as claimed in claim 12, wherein the oscillation causing means includes a control member which rotates about a rotational axis in response to said wheel speed input and which is axially movable along the rotational axis in response to said applied braking pressure input, and wherein the control member has a shape which causes a first cam follower to oscillate as the control member rotates, the amplitude of the oscillations varying as the control member is axially moved along the rotational axis.

14. Apparatus as claimed in claim 13, wherein the control member is generally frustoconical in shape, with one end having a generally circular cross-section in a direction perpendicular to the axis of rotation and the other end having a generally elliptical cross-section in the direction perpendicular to the axis of rotation.

15. Apparatus as claimed in claim 14, wherein the eccentricity of the cross-sections varies smoothly from an eccentricity of one at the generally circular end to a maximum eccentricity at the other end.

16. Apparatus as claimed in claim 13, including a combining means comprising said first cam follower and second cam follower, the first and second cam followers engaging opposite sides of the control member and being biased

10 against the control member by a spring to separately actuate respective brake shoes which form a caliper braking mechanism that oscillates synchronously, the amplitude of the oscillations changing as different cross-sections of the control member are presented to the cam followers in response to axial movement of the control member.

17. Apparatus as claimed in claim 12, wherein the wheel speed input means comprises a rotatable cable arranged to rotate with the wheel and connected to the control member.

18. Apparatus as claimed in claim 12, wherein the applied braking pressure input means comprises at least one cable attached to an end of the control member and arranged to pull the control member along the axis of rotation in response to activation of a manually-operated brake lever.

19. Apparatus as claimed in claim 18, wherein the at least one cable of the braking pressure input means is attached to the control member by means of an attachment fixture which is axially movable but which does not rotate, and to which the control member is rotatably connected.

20. Apparatus as claimed in claim 18, wherein the wheel speed input means comprises a rotatable cable arranged to rotate with the wheel and connected to the control member.

21. Apparatus as claimed in claim 12, wherein the oscillation causing means comprises a control disk having a contoured surface, the means for inputting the wheel speed comprises means for attaching the control-disk to an axle to rotate therewith, and the means for inputting the magnitude of braking pressure comprises means for linearly moving a pivotal bracket which holds the brake shoe, said bracket engaging different portions of the contoured surface when the bracket is linearly moved by said magnitude input means to thereby vary the magnitude of oscillations caused as the bracket follows the rotating contoured surface.

22. Apparatus as claimed in claim 21, wherein the control disk is annular and has an inner and outer circumference, and wherein the contoured surface is flat adjacent the outer circumference and has a maximum height at two diametrically opposite locations near the inner circumference.

23. Apparatus as claimed in claim 12, wherein the oscillation causing means comprises an axially movable rotating member and a prism shaped member, the prism shaped member being attached to a pivotal brake shoe mounting member so as to be engaged by the rotating member, the magnitude of oscillations depending on the axial position of the rotating member relative to the prism shaped member.

24. Apparatus as claimed in claim 23, wherein the rotating member is a T-shaped member having a cross-bar extending perpendicular to the axis of rotation of the rotating T-shaped member, the cross-bar engaging the T-shaped member to cause the mounting member to oscillate.

25. Apparatus as claimed in claim 12, wherein the oscillation causing means comprises a control member and a follower which engages the control member and is connected to the brake shoe, and wherein the wheel speed inputting means comprises means for causing the control member to rotate as the wheel rotates.

26. Apparatus as claimed in claim 25, wherein the magnitude inputting means comprises a pump which is engaged by the brake shoe and therefor responsive to braking pressure applied to the brake shoe, the pump being hydraulically connected to the control member to move the control member when the pump is actuated by movement of the brake shoe.

* * * * *